No. 802,687. PATENTED OCT. 24, 1905.
W. C. FOWLER & C. HOLTZ.
COMB.
APPLICATION FILED APR. 12, 1905.
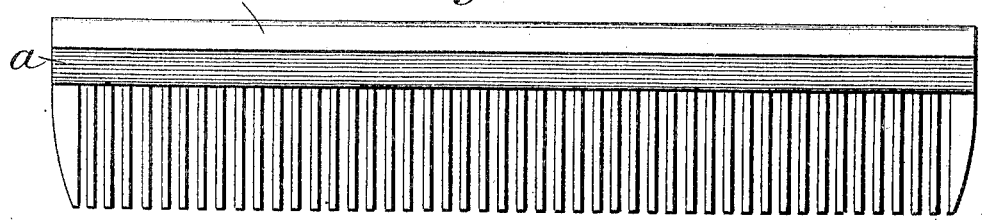
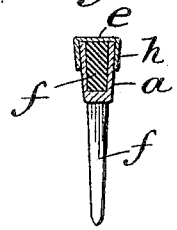 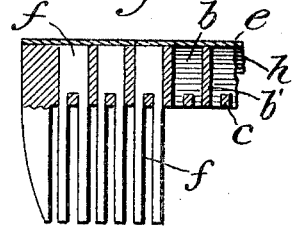 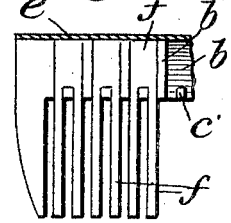
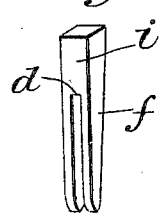 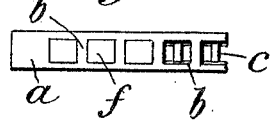 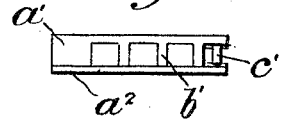
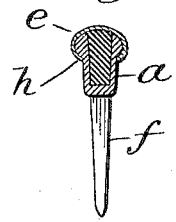  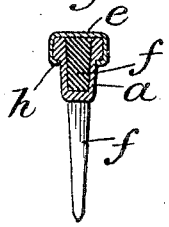
Witnesses: Inventors.

UNITED STATES PATENT OFFICE.

WALTER C. FOWLER AND CHARLES HOLTZ, OF TRENTON, NEW JERSEY.

COMB.

No. 802,687.  Specification of Letters Patent.  Patented Oct. 24, 1905.

Application filed April 12, 1905. Serial No. 255,146.

*To all whom it may concern:*

Be it known that we, WALTER C. FOWLER and CHARLES HOLTZ, citizens of the United States, residing at Trenton, county of Mercer, State of New Jersey, have invented certain new and useful Improvements in Combs; and we do hereby declare the following to be a full, clear, and exact description of the invention, such as will enable others skilled in the art to which it appertains to make and use the same.

The general object in view is to provide a comb where the teeth are removable, so that if broken the teeth may be replaced by others and so, also, that the comb may be readily cleaned by removing the teeth and restoring them to place.

The specific object is to provide a particular construction of removable teeth and a novel manner of detachably connecting them with the back of the comb, so that their removal and replacement may be easily and quickly effected.

The invention consists in providing the back of the comb with open-topped recesses to receive the teeth, a removable cover-plate being connected to the back, so as to close the recesses and hold the teeth therein. The recesses are shaped and constructed so that the teeth rest upon seats therein, these seats being preferably formed as will be described later on and the teeth being also preferably, though not necessarily, constructed in pairs for the purpose which will appear in the following description.

The invention is illustrated in the accompanying drawings, wherein—

Figure 1 is a side elevation of the comb embodying the invention. Fig. 2 is a cross-section of Fig. 1. Fig. 3 is a central longitudinal vertical section of Fig. 2. Fig. 4 is a plan view of Fig. 3, the top plate being removed. Fig. 5 is a view in elevation of the modified construction. Fig. 6 is a plan view of Fig. 5. Fig. 7 is a view of the preferable construction of the teeth. Figs. 8, 9, and 10 are cross-sectional views illustrating different ways of securing the cap-plate to the back.

Referring to the views, $a$ denotes the back of the comb. It is constructed with transverse recesses $b$, which are separated from one another by partitions $b'$, and into which the heads of the teeth fit with their points projecting through the bottoms of the recesses to any extent that the size or character of the comb may make desirable. At the bottoms of the recesses shoulders or ledges are preferably provided on which the teeth rest. As here shown, these shoulders are formed by cross-pieces $c$, extending across the recesses. These shoulders may, however, be constructed in any other way, or the recesses themselves may be so shaped as to dispense with the shoulders altogether.

The teeth $f$ are preferably made in pairs, as shown in Fig. 7—that is to say, each tooth preferably has a single head $i$ and two points—this construction providing the teeth with shoulders $d$, which rest upon the cross-pieces $c$ in the bottoms of the recesses $b$, with the points straddling the cross-pieces, as plainly illustrated in Fig. 3.

As already described, the teeth-receiving recesses are open-topped and the teeth are insertible in and removable from the top of these recesses. The back of the comb is provided with a removable cover-plate which closes the recesses and not only holds the teeth in place, but gives a neat and substantial appearance to the comb. The cover-plate $e$ is preferably arranged to slide lengthwise on the comb-back, and for this purpose it is provided with side flanges $h$, which grasp the upper edges of the back and preferably engage with shoulders extending longitudinally along the sides thereof, as best illustrated in Figs. 8, 9, and 10, in the ninth figure of which it will be noticed that the shoulders on the back are formed by grooves cut longitudinally therein, into which the inturned edges of the cover-plate slide. If preferred, however, the back of the comb may be made wedge-shaped in cross-sections, as shown in Fig. 2, so that the edges of the cap-plate will grasp it without the formation of inturned flanges thereon. Any other connection between the back of the comb and the cap-plate may be employed, such as providing the upper edges of the back with rounded bead-like flanges, as in Fig. 8, or with square or angular flanges, as in Fig. 10.

As shown in all but the fifth and sixth figures, the back of the comb is formed in one piece and the recesses $b$ are cut tranversely therein, leaving the cross-pieces $c$ at the bottoms of these recesses. If preferred, however, the back may be made of two pieces, as shown in Figs. 5 and 6, where one piece $a^2$ is a thin flat side plate and the other piece $a'$ has transverse ribs $b'$ projected therefrom at suitable distances apart to form the recesses $b$ when the two pieces of the back $a'$ and $a^2$ are secured together. In this construction the cross-pieces $c'$ are also formed as projections from the side $a'$ of the back, and the side $a^2$ of the back when secured in position simply abuts against the ends of the cross-pieces $c'$ and the partitions $b'$.

The construction being as thus described, it is to be noted that whether made in single or double form the teeth are easily insertible into the back and removable therefrom, it only being necessary to slide the cap-plate longitudinally along the back, so as to expose the open tops of the teeth-receiving recesses.

Having thus described our invention, what we claim, and desire to secure by Letters Patent, is—

1. A comb, comprising a back having open-topped recesses therein separated by cross-partitions, teeth insertible in and removable from the open tops of said recesses, and a removable cap-plate slidably secured on the back closing the recesses and holding the teeth therein.

2. A comb, comprising a back having open-topped recesses therein, teeth insertible in and removable from the open tops of said recesses, shoulders extending longitudinally along the outer sides of the back, and a removable cap-plate closing the recesses and holding the teeth therein, said cap-plate having inturned edges slidingly engaging the shoulders on the comb-back.

3. In a comb, the combination of the back $a$, having open-topped recesses $b$, provided with ledges or cross-pieces $c$ at their lower ends, multiple-pointed teeth insertible in and removable from the open tops of the recesses, said teeth having shoulders $d$ resting on ledges or cross-pieces $c$, and a removable cap-plate closing the recesses and holding the teeth in place.

4. In a comb, the combination of the back $a$, having open-topped recesses $b$, provided with ledges or cross-pieces $c$ at their lower ends, teeth constructed in pairs, and insertible in and removable from the open tops of the recesses $b$, said teeth straddling and resting with their shoulders $d$ upon the ledges or cross-pieces $c$, and a removable cap-plate closing the recesses and holding the teeth in place.

In testimony whereof we affix our signatures in presence of two witnesses.

WALTER C. FOWLER.
CHARLES HOLTZ.

Witnesses:
J. D. La Barre Schoonover,
M. A. Spaulding.